United States Patent
Yu

(10) Patent No.: US 8,727,571 B2
(45) Date of Patent: May 20, 2014

(54) BACKLIGHT MODULE WITH HEAT DISSIPATION ENHANCED WITH COATING OF MIXED MATERIALS AND DISPLAY DEVICE USING SAME

(75) Inventor: Yajun Yu, Guangdong (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 204 days.

(21) Appl. No.: 13/381,930

(22) PCT Filed: Nov. 14, 2011

(86) PCT No.: PCT/CN2011/082176
§ 371 (c)(1),
(2), (4) Date: Dec. 31, 2011

(87) PCT Pub. No.: WO2013/067716
PCT Pub. Date: May 16, 2013

(65) Prior Publication Data
US 2013/0114289 A1    May 9, 2013

(30) Foreign Application Priority Data
Nov. 9, 2011 (CN) .......................... 2011 1 0352045

(51) Int. Cl.
*G09F 13/04* (2006.01)

(52) U.S. Cl.
USPC ............................ 362/294; 362/602; 362/612

(58) Field of Classification Search
None
See application file for complete search history.

(56) References Cited

U.S. PATENT DOCUMENTS

2010/0033641 A1* 2/2010 Ogasawara et al. ............ 348/836
2011/0255030 A1* 10/2011 Pei ........................... 362/249.02

* cited by examiner

*Primary Examiner* — Britt D Hanley
(74) *Attorney, Agent, or Firm* — Cheng-Ju Chiang

(57) ABSTRACT

The present invention relates to a backlight module that enhances heat dissipation of LED light sources and a display device. The backlight module that enhances heat dissipation of LED light sources includes an LED light strip, a back panel, a mixed coating layer including two materials, and a thermal diode/triode. The LED light strip is arranged on the back panel. The mixed coating layer is interposed between the LED light strip and the back panel and contacts both for transfer of heat. The thermal diode/triode is connected to the mixed coating layer to control temperature of the mixed coating layer. In operation, through regulation of temperature, the thermal diode/triode makes vibration frequencies of the two materials of the mixed coating layer consistent with each other at a given temperature. The display device includes the above descried backlight module that enhances heat dissipation of LED light sources. The present invention realizes obstruction free transfer of heat from the LED light strip to the aluminum extrusion or the back panel, eliminating bottleneck of heat conduction path; reduces the temperature of the LED light strip, extending the overall lifespan of the LED light strip; and eliminates the use of thermal pad in the backlight module so as to facilitate designing narrow side frame of the backlight module.

6 Claims, 2 Drawing Sheets

Figure 1    (Prior Art)

BACKLIGHT MODULE WITH HEAT DISSIPATION ENHANCED WITH COATING OF MIXED MATERIALS AND DISPLAY DEVICE USING SAME

BACKGROUND OF THE INVENTION

1. Field of the Invention

The present invention relates to the technical field of display device, and in particular to a backlight module that enhances heat dissipation of LED (Light-Emitting Diode) light sources and a display device.

2. The Related Arts

An LED light strip is used as a backlighting source of backlight module. Since LED is of high power and great amount of heat generation, heat dissipation issue of the LED light strip must be addressed. A currently used common solution is to attach (or secure) an LED light strip to an aluminum extrusion (or back panel). Since a contact gap is present between the LED light strip and the aluminum extrusion (or back panel), contact thermal resistance is great, severely blocking heat transmitting from the LED light strip to the aluminum extrusion (or back panel). A known solution for such a problem is to add a thermal pad between the LED light strip and the aluminum extrusion (or back panel) in order to fill the air gap and reduce the thermal resistance. However, thermal conductivity of the thermal pad is low and this makes the thermal condition of the thermal pad itself very poor and becoming a bottleneck that affects the overall heat conduction path.

As shown in FIG. 1, a partial schematic view of a known backlight module is shown. An LED light strip 60 releases a great amount of heat in an operation condition and the heat of the LED light strip 60 is conducted through a thermal pad 70 to an aluminum extrusion 80, and subsequently, through contact engagement between the aluminum extrusion 80 and a back panel 90, the heat is transferred to the back panel 90 and is further dissipated to air through the back panel 90. In such a heat flow path, the thermal pad 70 is the one that has the lowest thermal conductivity and is thus the bottleneck of the overall heat dissipation path, which makes the heat of the LED light strip 60 not timely and effectively conducted away and leads to extremely high temperature inside the whole module, so as to affect optic balance of the module and the lifespan of the LED light strip 60. Further, since the thermal pad 70 has a substantial thickness, it is adverse to an attempt to make side frame of the whole module narrowed.

SUMMARY OF THE INVENTION

Thus, an objective of the present invention is to provide a backlight module that enhances heat dissipation of LED light sources and a display device, which adopt a mixed coating layer that comprises two materials and thermal diode/transistor to enhance heat dissipation performance and also help narrowing side frame of the backlight module.

To achieve the objective, the present invention provides a backlight module that enhances heat dissipation of LED light sources, comprising an LED light strip, a back panel, a mixed coating layer comprising two materials, and a thermal diode/triode. The LED light strip is arranged on the back panel. The mixed coating layer is interposed between the LED light strip and the back panel and contacts both for transfer of heat. The thermal diode/triode is connected to the mixed coating layer to control temperature of the mixed coating layer. In operation, through regulation of temperature, the thermal diode/triode makes vibration frequencies of the two materials of the mixed coating layer consistent with each other at a given temperature.

One of the two materials has a molecular vibration frequency that varies, not proportionally, with variation of temperature and the other material has a vibration frequency that varies proportionally with variation of temperature.

The present invention also provides a backlight module that enhances heat dissipation of LED light sources, comprising an LED light strip, an aluminum extrusion, a back panel, a mixed coating layer comprising two materials, and a thermal diode/triode. The LED light strip is arranged on the aluminum extrusion. The aluminum extrusion is arranged on the back panel. The mixed coating layer is interposed between the LED light strip and the aluminum extrusion and contacts both for transfer of heat. The thermal diode/triode is connected to the mixed coating layer to control temperature of the mixed coating layer. In operation, through regulation of temperature, the thermal diode/triode makes vibration frequencies of the two materials of the mixed coating layer consistent with each other at a given temperature.

One of the two materials has a molecular vibration frequency that varies, not proportionally, with variation of temperature and the other material has a vibration frequency that varies proportionally with variation of temperature.

The present invention also provides a display device comprising the above-described backlight module that enhances heat dissipation of LED light sources.

The backlight module that enhances heat dissipation of LED light sources and the display device of the present invention can realize obstruction free transfer of heat from an LED light strip to an aluminum extrusion or a back panel, eliminating bottleneck of heat conduction path; reduce the temperature of the LED light strip, extending the overall lifespan of the LED light strip; eliminate the use of thermal pad in the backlight module so as to facilitate designing narrow side frame of the backlight module; and thus extend the lifespan of the display device and facilitates development for compactness of the display device.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, will be apparent from the following detailed description of an embodiment of the present invention, with reference to the attached drawings. In the drawings.

DETAILED DESCRIPTION OF THE PREFERRED EMBODIMENTS

Figure 1:
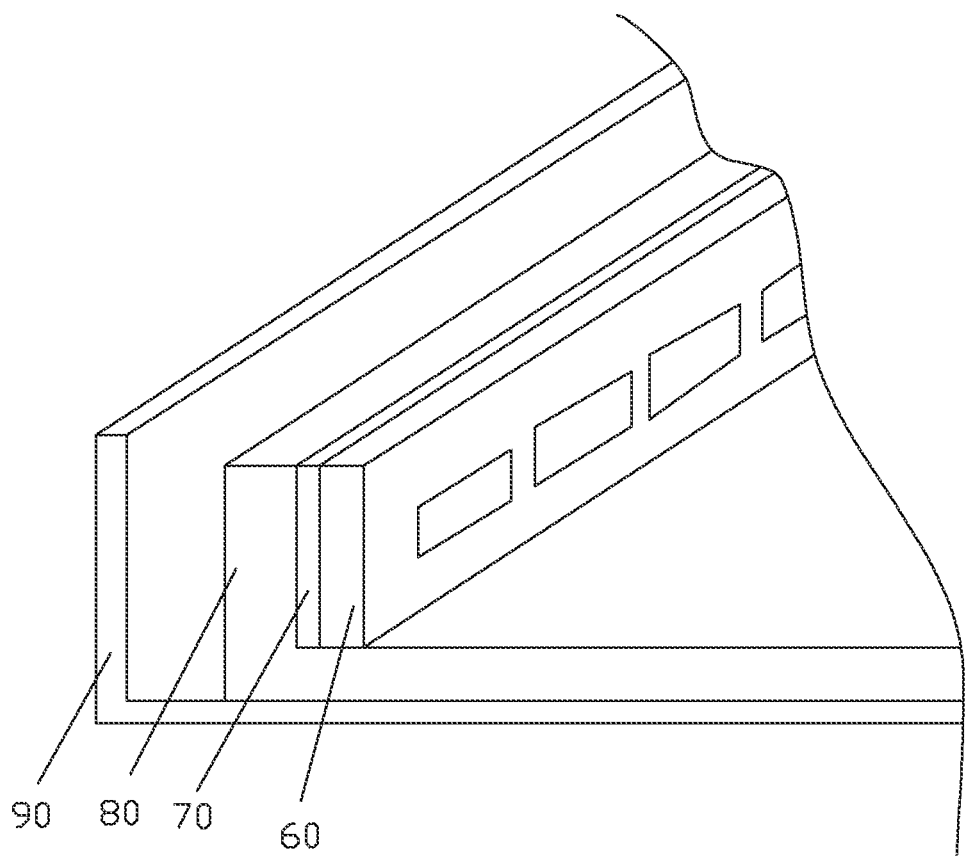
FIG. 1 is a partial schematic view of a known backlight module.
Figure 2:
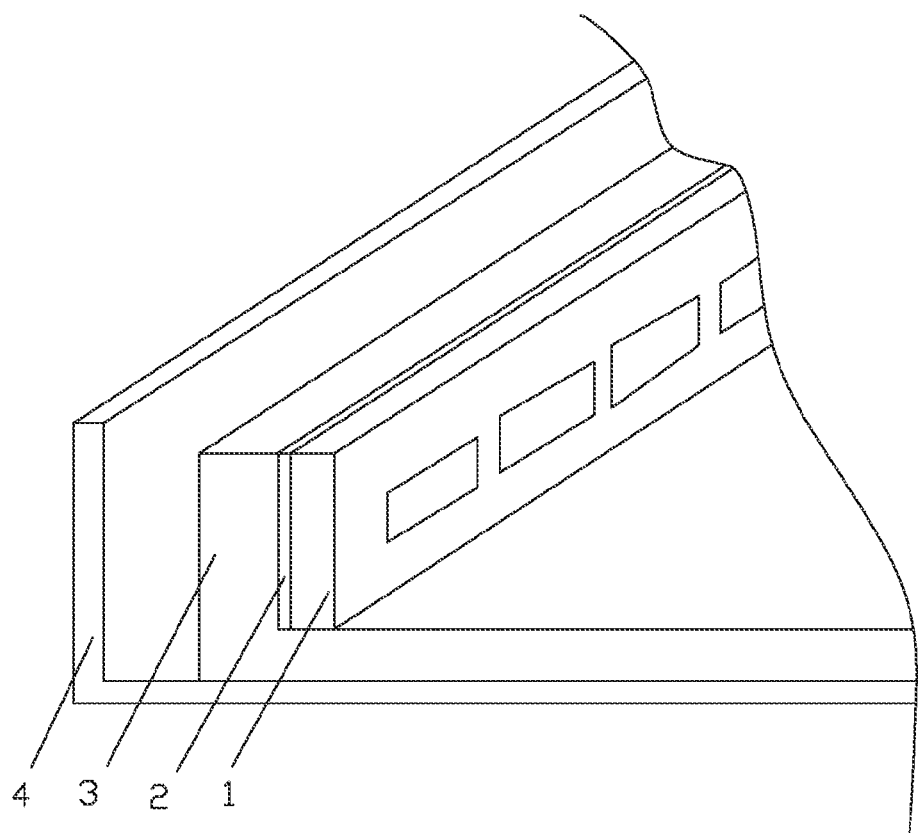
FIG. 2 is a partial schematic view of a backlight module that enhances heat dissipation of LED light sources according to a preferred embodiment of the present invention.

Referring to FIG. 2, which is a partial schematic view of a backlight module that enhances heat dissipation of LED light sources according to a preferred embodiment of the present invention, the backlight module that enhances heat dissipation of LED light sources comprise an LED (Light-Emitting Diode) light strip 1, an aluminum extrusion 3, a back panel 4, a mixed coating layer 2 that comprises two materials, and a thermal diode/triode (not shown). The LED light strip 1 is arranged on the aluminum extrusion 3, and the aluminum extrusion 3 is arranged on the back panel 4. The mixed coating layer 2 is interposed between the LED light strip 1 and the aluminum extrusion 3 and contacts both for transfer of heat. Thermal diode/triode is connected to the mixed coating layer 2 to control the temperature of the mixed coating layer 2. In operation, through regulation of temperature, the thermal diode/triode makes the vibration frequencies of the two materials of the mixed coating layer 2 consistent with each other at a given temperature.

As an alternative embodiment, the present invention does not use an aluminum extrusion. In other words, the backlight module that enhances heat dissipation of LED light sources according to the present invention comprises the LED light strip 1, the back panel 4, the mixed coating layer 2 that comprises two materials, and the thermal diode/triode (not shown), and the LED light strip 1 is disposed on the back panel 4 and the mixed coating layer 2 is interposed between the LED light strip 1 and the back panel 4 and contacts both for transfer of heat. Thermal diode/triode is connected to the mixed coating layer 2 to control the temperature of the mixed coating layer 2. In operation, through regulation of temperature, the thermal diode/triode makes the vibration frequency of the two materials of the mixed coating layer 2 consistent with each other at a given temperature.

Figure 3:
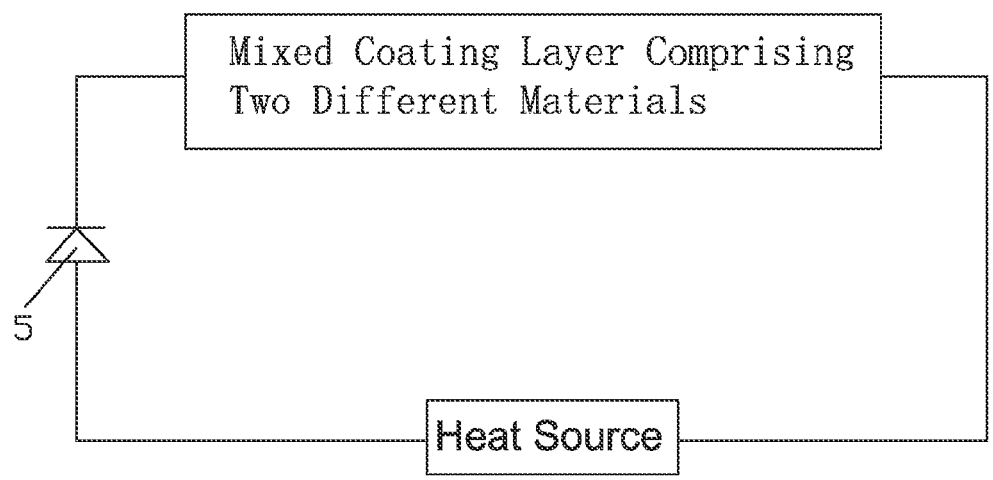
FIG. 3 is a schematic view illustrating the principle of temperature regulation performed by the backlight module that enhances heat dissipation of LED light sources according to the present invention through a thermal diode/triode.

Referring to FIG. 3, which is a schematic view illustrating the principle of temperature regulation performed by the backlight module that enhances heat dissipation of LED light sources according to the present invention through the thermal diode/triode, each atom or molecule has its own vibration frequency and thermal energy may easily affect the vibration of an atom or molecule. Thus, when the molecules of two materials reaches have consistent vibration frequency, thermal energy can be easily transferred from one material to the other.

The mixed coating layer has a composition that comprises two materials, of which one has molecular vibration frequency that varies, not proportionally, with variation of temperature and the other has a vibration frequency that varies proportionally with variation of temperature. In the instant embodiment, a thermal triode 5 is used to control the temperatures of the two materials of the mixed coating layer so as to make, through regulation of temperature, the vibration frequencies of the molecules of the two materials consistent with each other at a given temperature, whereby the transfer of thermal flow between the LED light strip and the aluminum extrusion is almost not hindered.

The present invention uses a mixed coating layer comprising two material to replace the use of thermal pad and uses a thermal diode/triode to realize control of the mixed coating layer, so as to achieve a thermal resistance-free condition of the mixed coating layer, realize fast transfer of thermal energy from the LED light strip to the aluminum extrusion or the back panel, realize obstruction free transfer of heat flow, and eliminate the use of thermal pad; and the mixed coating layer is of a thickness that is smaller than the conventionally used thermal pad and this facilitates narrowing side frame of a backlight module.

The present invention also provides a display device, which comprises the backlight module that enhances heat dissipation of LED light sources described above. Other constituent components of the display device are known techniques and description will be omitted herein.

The display device of the present invention that uses the backlight module that enhances heat dissipation of LED light sources can realize obstruction free transfer of heat from the LED light strip to the aluminum extrusion or the back panel, eliminating bottleneck of heat conduction path; reduce the temperature of the LED light strip, extending the overall lifespan of the LED light strip; eliminate the use of thermal pad in the backlight module so as to facilitate designing narrow side frame of the backlight module; and thus extend the lifespan of the display device and facilitates development for compactness of the display device.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A backlight module that enhances heat dissipation of LED (Light-Emitting Diode) light sources, comprising an LED light strip, a back panel, a mixed coating layer comprising two materials, and a thermal diode/triode, the LED light strip being arranged on the back panel, the mixed coating layer being interposed between the LED light strip and the back panel and contacting both for transfer of heat, the thermal diode/triode being connected to the mixed coating layer to control temperature of the mixed coating layer, whereby in operation, through regulation of temperature, the thermal diode/triode makes vibration frequencies of the two materials of the mixed coating layer consistent with each other at a given temperature.

2. The backlight module that enhances heat dissipation of LED light sources as claimed in claim 1, wherein one of the two materials has a molecular vibration frequency that varies, not proportionally, with variation of temperature and the other material has a vibration frequency that varies proportionally with variation of temperature.

3. A display device comprising a backlight module that enhances heat dissipation of LED light sources as claimed in claim 1.

4. A backlight module that enhances heat dissipation of LED (Light-Emitting Diode) light sources, comprising an LED light strip, an aluminum extrusion, a back panel, a mixed coating layer comprising two materials, and a thermal diode/triode, the LED light strip being arranged on the aluminum extrusion, the aluminum extrusion being arranged on the back panel, the mixed coating layer being interposed between the LED light strip and the aluminum extrusion and contacting both for transfer of heat, the thermal diode/triode being connected to the mixed coating layer to control temperature of the mixed coating layer, whereby in operation, through regulation of temperature, the thermal diode/triode makes vibration frequencies of the two materials of the mixed coating layer consistent with each other at a given temperature.

5. The backlight module that enhances heat dissipation of LED light sources as claimed in claim 4, wherein one of the two materials has a molecular vibration frequency that varies, not proportionally, with variation of temperature and the other material has a vibration frequency that varies proportionally with variation of temperature.

6. A display device comprising a backlight module that enhances heat dissipation of LED light sources as claimed in claim 4.

* * * * *